United States Patent
Ghomeshi et al.

(10) Patent No.: US 7,187,767 B2
(45) Date of Patent: Mar. 6, 2007

(54) COMMUNICATION DEVICE WITH DUAL-MODE MUTING AND METHOD THEREFOR

(75) Inventors: Mohammad Mansour Ghomeshi, Weston, FL (US); Ali Behboodian, Plantation, FL (US); Patrick J. Doran, Fairfax, VA (US)

(73) Assignee: Motorola, Inc., Schaumburg, IL (US)

( * ) Notice: Subject to any disclaimer, the term of this patent is extended or adjusted under 35 U.S.C. 154(b) by 715 days.

(21) Appl. No.: 10/606,477

(22) Filed: Jun. 26, 2003

(65) Prior Publication Data

US 2004/0266488 A1  Dec. 30, 2004

(51) Int. Cl.
H04M 1/00  (2006.01)
H04M 3/42  (2006.01)

(52) U.S. Cl. .................. 379/421; 379/202.01; 455/416
(58) Field of Classification Search ................ 379/421, 379/422, 202.01, 203.01; 381/94.5, 104, 381/109; 455/567, 550.1, 415, 416
See application file for complete search history.

(56) References Cited

U.S. PATENT DOCUMENTS 5,191,607 A * 3/1993 Meyers et al. .............. 379/421
5,555,533 A   9/1996 Peck

* cited by examiner

Primary Examiner—Curtis Kuntz
Assistant Examiner—Tuan Duc Nguyen (57) ABSTRACT

A communication device (200) for dual mode muting operation includes a user interface (208) and a controller (202). The controller (202) is programmed to: in response to a first user input to the user interface (208), enable a first muting mode; and in response to a second user input to the user interface (208), disable the first muting mode and enable a second muting mode. The first muting mode may be one of a full muting and a concealed muting, while the second muting mode may be the other one of a full muting and a concealed muting.

22 Claims, 4 Drawing Sheets

COMMUNICATION DEVICE WITH DUAL-MODE MUTING AND METHOD THEREFOR

FIELD OF THE INVENTION

The present invention generally relates to the field of communication systems, and more particularly relates to communication devices, both wireless devices and wired devices, having muting capabilities.

BACKGROUND OF THE INVENTION

In the past few years, cellular telephones, Personal Digital Assistants (PDA's), messaging devices, and other portable electronic devices having communication capabilities have become a staple of everyday life. It is not uncommon for the average person to possess more than one communication device. As these devices evolve the prices decline while the feature set expands. With the decline in price, the communication devices attract a broader portion of the economic demographic. The increased demand and revenue generated by the popularity allows for the expansion of systems and capabilities, making such devices useful in many places. This allows wireless connection to telephone systems, processing of email, playing electronic games, accessing the Internet and other various communication functions. It is anticipated as the decline in price continues combined with the expansion of features the use and demand of such device will become an integral and permanent part of peoples' everyday life. Device manufactures utilize technological innovation to carefully balance excitement and fun against convenience and simplicity to use. Device customers strive to improve productivity while being ahead of the crowd with customization and applications. Though customers sometimes focus on productivity at the same time their desire for devices is often stimulated by entertainment, gaming and additional capabilities. To meet customer demands device manufactures have created devices that allow users to have multiple voice and data connections, and speakerphones and including capabilities to selectively mute audio connections.

Prior art devices offer a single muting scheme. Some devices offer mute by cutting off any audio from being delivered from a local, or near-end, device to a remote, or far-end, device. Other devices offer mute by creating a noise signal that is delivered from the local device to the remote device. Unfortunately, a single muting scheme may not be desirable in all situations for users of these devices. This constrained muting scheme can lead to inconvenience and frustration of such users, resulting in detrimental perception of value of these devices. Regrettably, this can negatively affect commercial viability in an increasingly competitive marketplace for such devices.

Therefore a need exists to overcome the problems with the prior art as discussed above.

SUMMARY OF THE INVENTION

According to a preferred embodiment of the present invention, a method in a communication device comprises: detecting in a communication device an activation of a user interface by a first user input; in response to detection of the first user input, enabling a first muting mode in the communication device; detecting in the communication device an activation of the user interface by a second user input; and in response to detection of the second user input, disabling the first muting mode and enabling a second muting mode in the communication device.

According to a preferred embodiment of the present invention, a communication device comprises: a user interface responsive to user input; and a controller, communicatively coupled to the user interface, for: detecting in the communication device an activation of the user interface by a first user input; in response to detection of the first user input, enabling a first muting mode in the communication device; detecting in the communication device an activation of the user interface by a second user input; and in response to detection of the second user input, disabling the first muting mode and enabling a second muting mode in the communication device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, overcomes problems with the prior art by allowing the user to selectively predetermine the mute scheme at the near-end device. This allows convenience for both a near-end user and far-end users. The far-end users will not be confused due to the operation of the muting function and erroneously terminate and/or reinitiate calls, nor experience background levels of sound rendering the speaking voice unintelligible. The present invention allows the near-end user to select the preferred muting scheme for a given situation.

Two exemplary muting schemes are offered as muting features of exemplary embodiments of the present invention, e.g., "Full Mute" and "Concealed Mute".

A "Full Mute" scheme allows the near-end user to prevent the near-end user's audio from being picked up by a microphone of the near-end user's device and sent to the far-end user's device, for instance in a conference call. In the "Full Mute" scheme, the least amount of energy, (sound), is transmitted by forcing the uplink audio to zero, no audio transmission. With this scheme, the far-end user should hear nothing (but often noise picked up in the transmission results in some noise level at the far-end). This absence of sound or audio interaction frequently leads the far-end user to believe the connection was terminated requiring far-end user inquiry or reinitiating of the communication path connection. This "Full Mute" scheme is better applied to situations, such as a conference call, where the near-end user wishes to mute any audio from interfering with the sound signals from remote device(s).

There are times when the near-end user would desire to mute without the far-end user's knowledge, for example, to converse with associates listening to the call, but with the full mute implementation it is likely the far-end user can detect the mute. These conditions can cause far-end user frustration. For such situations, the "Concealed Mute" scheme is offered according to exemplary embodiments of the present invention. This mute scheme tries to overcome the silence issues (of the Full Mute scheme) by forcing the uplink audio from the near-end user to a value such as near the level of the background noise of the device ambient environment. In an optimum implementation of "Concealed Mute", the far-end user would not be capable of determining if the near-end user was muted, or not muted and just not speaking. One possible drawback with this approach is that the greater the ambient noise level is at the near-end; the higher the value of background noise the far-end user receives. In a conference call situation, the concealed mute noise from one or more lines could detract from the near-end user speech level reducing the speech from being heard by others on the conference call. So, this "Concealed Mute" scheme would likely be better applied to situations other than in a conference call.

Figure 1:
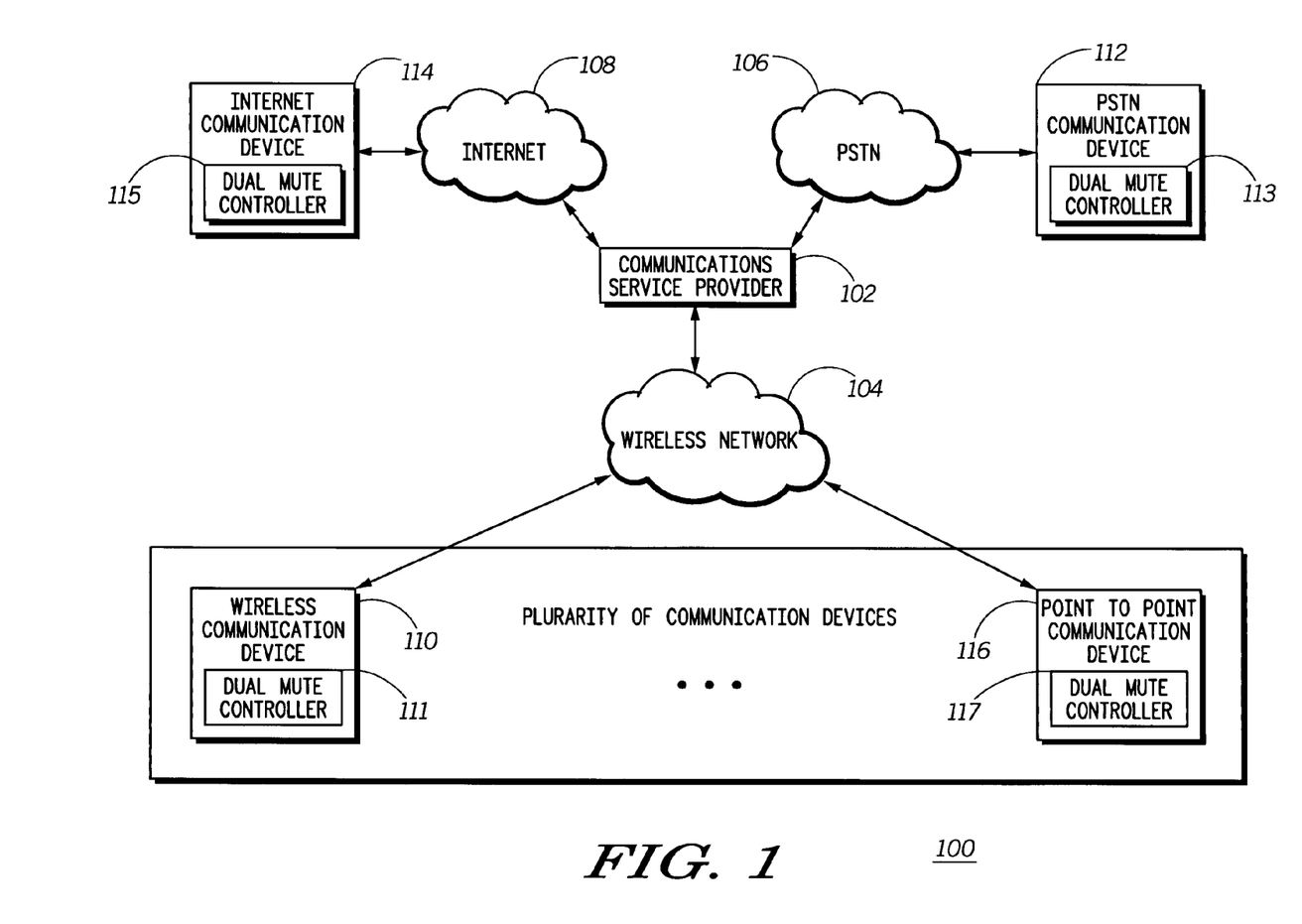
FIG. 1 is an electronic block diagram illustrating a communication system.

According to an exemplary embodiment of the present invention, FIG. 1 illustrates a communication system 100.

The communication system 100 of FIG. 1 includes a communications service provider 102, shown in this example, communicatively coupled to a wireless network 104. It will be appreciated by those of ordinary skill in the art that although in this exemplary embodiment the network is shown as a wireless network, the communications network can be embodied as a wired network, a wireless network, or a combination of a wired and wireless network. The wireless network 104 further can be communicatively coupled to one or more wireless communication devices, such as a wireless communication device 110, with a dual mute controller 111, for providing muting features and functions as will be discussed below, a point to point, (PTT), wireless communication device 116 with a dual mute controller 117 for providing muting features and functions as will be discussed below, and any equivalent such devices. The wireless network 104 similarly can be communicatively coupled to other networks. One skilled in the art would understand these additional networks can compose the Internet 108, shown communicatively coupled to one or more Internet network communication devices 114 with a dual mute controller 115 for providing muting features and functions as will be discussed below a public switched telephone network (PSTN) 106 shown communicatively coupled to one or more PSTN communication devices 112 with a dual mute controller 113 for providing muting features and functions as will be discussed below. In the description, the term "network" and "network communication devices" refers to any network or network communication device mentioned or an equivalent. One skilled in the art would recognize the networks could support a plurality of communication devices that could operate on one of the networks or a combination of the networks. It would be appreciated by one of ordinary skill in the art that the wireless network 104 can be a first-generation analog mobile phone service, a second-generation (2G) digital mobile phone service (including 2.5G and 2.75G), a third-generation (3G) Internet-capable mobile phone service, a messaging network, a conventional PSTN 106, or the like. Further, the communications standard of the wireless network 104 of FIG. 1 can be Code Division Multiple Access (CDMA), Time Division Multiple Access (TDMA), Global System for Mobile Communications (GSM), General Packet Radio Service (GPRS), Frequency Division Multiple Access (FDMA), twisted pair Wire Line or the like. Similarly, it will be appreciated by one of ordinary skill in the art that the wireless network 104, in conjunction with the present invention, can function utilizing any wireless channel, for example, mobile cellular telephone channel, mobile radio channels, (including push to talk radio channels), one and two way messaging channels, data channels or any equivalent. Additionally, the wireless network 104 can function utilizing other types of communication channels such as the Internet, infrared channels, wired channels and/or Bluetooth channels. In the following description, the term "communication system" refers to any wireless communication system or wired communication system or device of the communication systems discussed above or following or an equivalent.

Generally, communication system 100 supports any number of wireless or wired devices (110,112,114,116), which can be mobile telephones, Personal Digital Assistants, Computers, push-to-talk mobile radios, point to point communication devices, telephones, handheld computers, two way messaging devices with audio capability, network communication devices, Internet communication devices, or the like.

Figure 2:
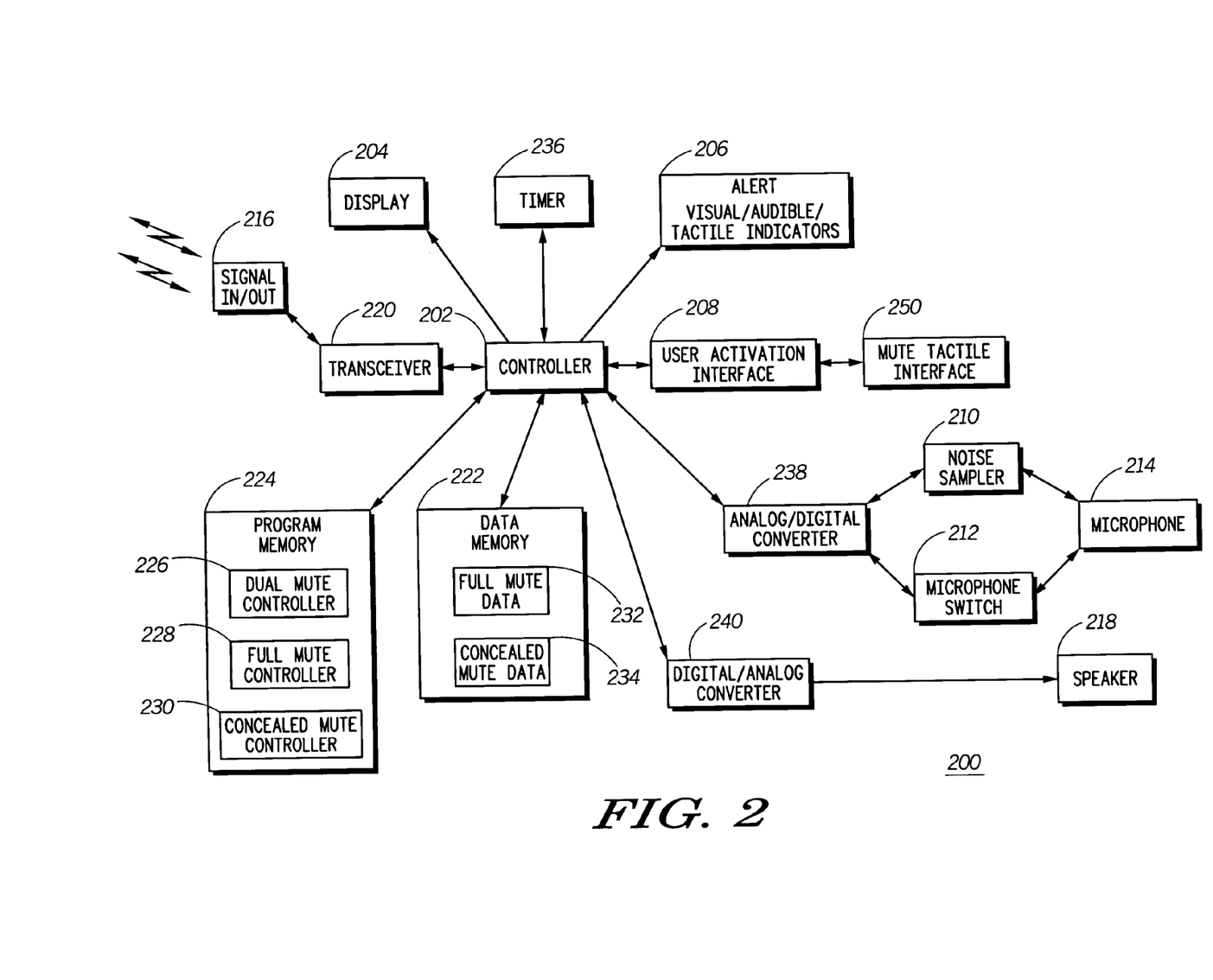
FIG. 2 is an electronic block diagram illustrating a communication device for use within the communication system of FIG. 1.

FIG. 2 is a more detailed block diagram of a communication device 200 suitable for use within the communication system 100 of FIG. 1, in accordance with a preferred embodiment of the present invention. The communication device 200 can be, for example, any one of the plurality of communication devices as illustrated and discussed for FIG. 1 such as the wireless communication device 110 and the point-to-point wireless communication device 116. As illustrated, the communication device 200 of FIG. 2 includes a controller 202, a display 204, an alert 206, a user activation interface 208, a noise sampler 210, a microphone switch 212, a microphone 214, a signal input/output (I/O) 216, a speaker 218, a transceiver 220, a program memory 224, a data memory 222, a timer 236, an analog to digital (A/D) converter 238, and a digital to analog (D/A) converter 240.

The signal I/O 216 intercepts transmitted signals such as from the communication system 100. The signal I/O 216 is coupled to the transceiver 220, which employs conventional modulation and demodulation techniques for receiving the communication signals transmitted by the communication system 100 to the communications device 200. The transceiver 220 further transmits signals via the signal I/O 216 in response to commands from the controller 202. It will be appreciated by those of ordinary skill in the art that the transceiver 220 can be a singular electronic circuit capable of both functions, or alternatively can be an individual receiver circuit and a transmitter circuit. Similarly, the signal I/O 216 can be one integrated circuit or can be an individual signal input circuit and a signal output circuit. It will be appreciated by one of ordinary skill in the art that other similar electronic block diagrams of the same or alternative types can be utilized to handle the communication requirements of the communication device 200.

Figure 4:
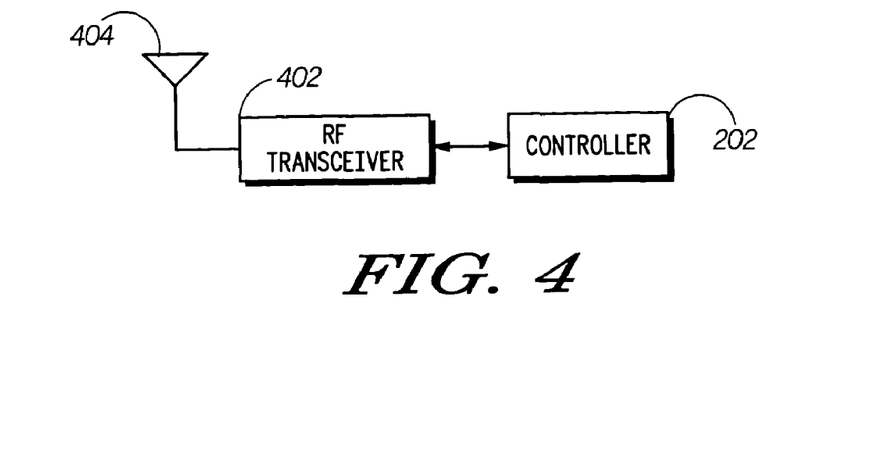
FIG. 4 is an electronic block diagram illustrating a transceiver interface for a wireless communication device within the communication system of FIG. 1, according to an exemplary embodiment of the present invention.

FIG. 4 illustrates a wireless communication systems interface 400 for use within a communications device such as the wireless communication device 110 of FIG. 1. As illustrated, the wireless communication systems interface 400 comprises an antenna 404, an RF transceiver 402, and a controller 406. The antenna 404 is coupled to a wireless network such as the wireless network 104 of FIG. 1, to send and receive wireless data and voice. The antenna 404 further is coupled to the RF transceiver 402 utilizing conventional RF modulation and RF demodulation techniques for receiving the communication signals received from the wireless network 104 via the antenna 404. The RF transceiver 402 is coupled to the controller 406. The controller 406, for example, can be similar to the controller 202 of FIG. 2. The controller 406 manages the information the transceiver 402 sends to through the antenna 404 to the wireless network 104 as discussed below.

Figure 5:
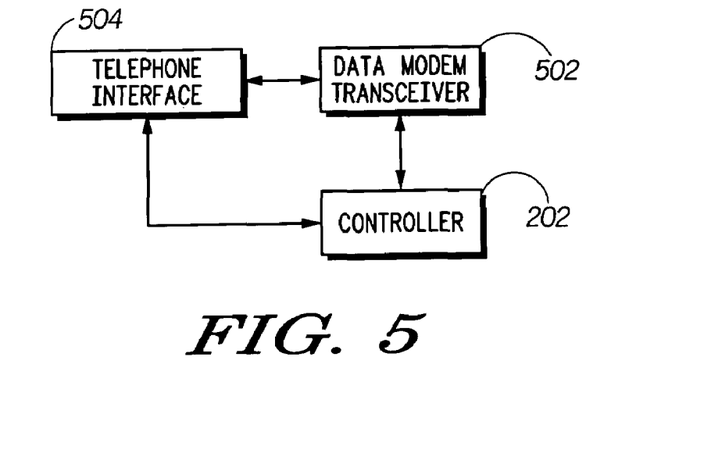
FIG. 5 is an electronic block diagram illustrating a transceiver interface for a PSTN communication device within the communication system of FIG. 1, according to an exemplary embodiment of the present invention.

FIG. 5 illustrates a PSTN communication interface 500 for use within a communications device such as the PSTN communication device 112 of FIG. 1. As illustrated, the PSTN communication interface 500 includes a telephone interface 504, a data modem transceiver 502, and a controller 506. The telephone interface 504 is coupled to a PSTN such as the PSTN 106 of FIG. 1, to send and receive wireless data and voice. The telephone interface 504 is coupled to the data modem transceiver 502 and the controller 506. The controller 506, for example, can be similar to the controller 202 of FIG. 2. The data modem transceiver 502 utilizes conventional PSTN modulation and PSTN demodulation techniques for receiving the communication signals transmitted through the telephone interface 504. The controller 506 monitors, or receives inputs from, the telephone interface 504 and exchanges voice and data with the data modem transceiver 502.

Figure 6:
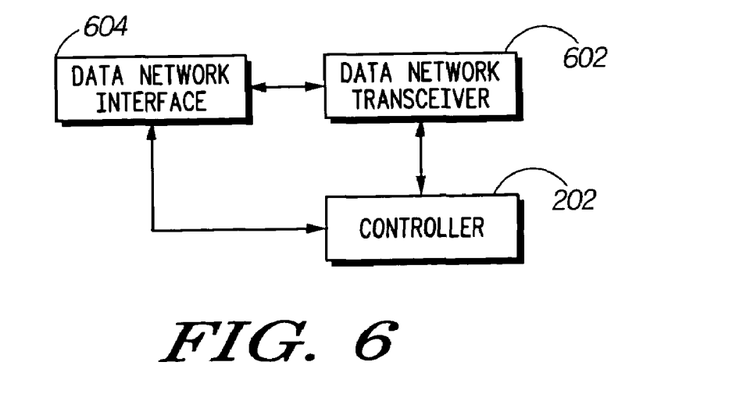
FIG. 6 is an electronic block diagram illustrating a transceiver interface for a network communication device within the communication system of FIG. 1, according to an exemplary embodiment of the present invention.

FIG. 6 illustrates a network communications interface 600 for use within a network communication device such as the Internet communication device 114 of FIG. 1. As illustrated, the network communications interface 600 includes a data network interface 604, a data network transceiver 602, and a controller 606. The data network interface 604 is coupled to the Internet 108 of FIG. 1, to send and receive network data and voice. The data network interface 604 is coupled to the data network transceiver 602, which utilizes conventional network modulation and network demodulation techniques for receiving the communication signals transmitted by the Internet 108 and is coupled to the controller 606. The data network transceiver 602 is coupled to the controller 606. The controller 606 monitors, or receives inputs from, the data network interface 604 and exchanges voice and data with the data network transceiver 602.

Referring back to FIG. 2, coupled to the transceiver 220 is the controller 202. The controller 202 utilizes conventional signal processing techniques for processing the received signals. The controller 202 further sends commands to various operative components of the communication device 200 as described herein.

To perform the necessary functions of the exemplary communication device 200, the controller 202 is coupled to a display 204. Upon receipt of a signal, the controller 202, for example, can generate a command signal to the display 204 to generate a visual notification of the receipt of the signal. When the display 204 receives the command signal from the controller 204, a notification can be displayed. The display 155 can be, for example, a liquid crystal display, a dot matrix display, or an equivalent. The display 204 can be a textual or graphic display in color or grayscale or equivalent. The display 204 can include indicators and/or annunciators, or the equivalent, which would allow the user to visually determine the status of the communications device 200.

The controller 202 is also coupled to the alert 206. The alert 206 can include an alert circuit (not shown), a speaker (not shown) with associated speaker drive circuitry capable of playing melodies and other audible alerts, a vibrator (not shown) with associated vibrator drive circuitry capable of producing a physical vibration such as for a tactile alert, or one or more light emitting diodes (LEDs) (not shown) with associated LED drive circuitry capable of producing a visual alert or the equivalent. It will be appreciated by one of ordinary skill in the art that other similar alerting means as well as any combination of the audible, vibratory, and visual alert outputs described can be used for the alert 206.

The controller 202 is further coupled to the user activation interface 208. The user activation interface 206 can include one or more buttons (not shown), a series of button presses, a voice response from the device user, a toggle switch with associated circuitry (not shown), momentary contact switch with associated circuitry (not shown), push button with associated circuitry (not shown), or any user activation signal or some other similar method of manual response initiated by a user of the communication device 200. One of ordinary skill in the art would appreciate the user activation interface can be a combination of switches, buttons, or equivalent capable of generating a signal to the controller, such as an interrupt signal or a polled signal detected by the controller, representing an activation signal.

In accordance with the present invention, the user activation interface 208 includes a mute tactile interface 250. The mute tactile interface 250 allows a device user to control the muting operation of the communication device 200. For example, when the mute tactile interface 250 receives a first user input, such as a button press, from a device user, a concealed mute operation of the communication device 200 is activated and a timer within the timer 236 is set. When the mute tactile interface 250 receives a second user input, such as a second button press, before the timer expires, a full mute operation is activated. If the timer expires or after full mute operation is activated, the functionality of the mute tactile interface 250 once again changes. Another user input to the mute tactile interface 250 can then causes the muting to be cancelled and the communication device 200 to operate in a non-muted condition. In other words, the mute tactile interface 250 facilitates the varying of the muting operation as desired and/or required by the device user.

Further the controller 202 is coupled to an analog-to-digital (A/D) converter 238. The A/D converter 238 is coupled to the noise sampler 210 and the microphone switch 212. The noise sampler 210 and the microphone switch 212 are coupled to the microphone 214. The A/D converter 238 translates the analog signals received from the noise sampler 210 to digital signals the controller 202 can manipulate. Likewise the A/D converter 238 translates the analog signals from the microphone 214 to digital signals the controller 202 can manipulate. The controller 202 can instruct the A/D converter 238, which could include control circuitry (not shown), or equivalent, to manipulate the actuation of the microphone switch 212. One skilled in the art would recognize manipulation of the switch 212 could be accomplished with direct signals or multiplexed signals from the controller 202 to select the audio source either from the microphone 214 or from the noise sampler 210.

The noise sampler 210 can have associated circuitry, which could include analog to digital conversions and level shifting (not shown) and can include its own sampling device (not shown) allowing direct coupling to the controller. The noise sampler 210 periodically samples the ambient noise level of the environment, in which the communication device 200 is operating, through the microphone 214. The noise sampler 210 is electrically coupled to the microphone 214.

The microphone switch 212 can be a switch, potentiometer, or the equivalent, with the ability to selectively couple the output of the microphone 214 to the A/D converter 238. The microphone switch 212 can affect the output of the microphone 214 in a plurality of ways, from off to on, from on to off, fractions of attenuation, or tri-state the output from the microphone 214.

The microphone 214 captures sound audio signals from the user and from the surrounding environment. The microphone 214 can include associated circuitry (not shown) such as an integral switch circuitry (not shown).

The controller 202 is also coupled to the digital-to-analog (D/A) converter 240. The D/A converter 240 translates the digital signals from the controller 202 to analog signals capable of generating audio output by the speaker 218.

The controller 202 is coupled to the timer 236. The timer 236 has a plurality of functions including a count down or up ability, clock functions, and date functions. The timer 236 can provide timing for the controller 202 and can provide a source for timing of feature enhancements such as inactive and active periods of operation or periods of alerting. It should be obvious to one of ordinary skill in the art that the controller 202 can utilize the timer 236 to keep track of or request, time, date, elapsed time, time remaining, or the equivalent.

The controller 202 is coupled to the program memory 224 and to the data memory 222 and thereby operates, functions having features of the communication device 200. The program memory 224 and the data memory 222 preferably compose a random access memory (RAM), a read-only memory (ROM), and/or an electrically erasable programmable read-only memory (EEPROM)(not shown), flash memory, or an equivalent. The program memory 224 preferably includes a dual mute controller 226, a full mute controller 228 and a concealed mute controller 230. The controller 202 is further coupled to the data memory 222, which preferably includes full mute data 232 and concealed mute data 234. The controller 202 executes the program steps from the program memory 224 and utilizes the data from the data memory 222. The programs in the program memory 224 can be hard coded or programmed into the communication device 200 during manufacturing, can be programmed over-the-air upon customer subscription, or can be downloadable applications. It will be appreciated by one of ordinary skill in the art that other programming methods can be utilized for programming the program memory 224. Similarly, the data stored in the data memory 222 can be hard coded or programmed into the communication device 200 during manufacturing, can be programmed over the air upon customer subscription, or can be downloaded. It will be appreciated by one of ordinary skill in the art that other programming methods can be utilized for programming the data into the data memory 222.

Figure 3:
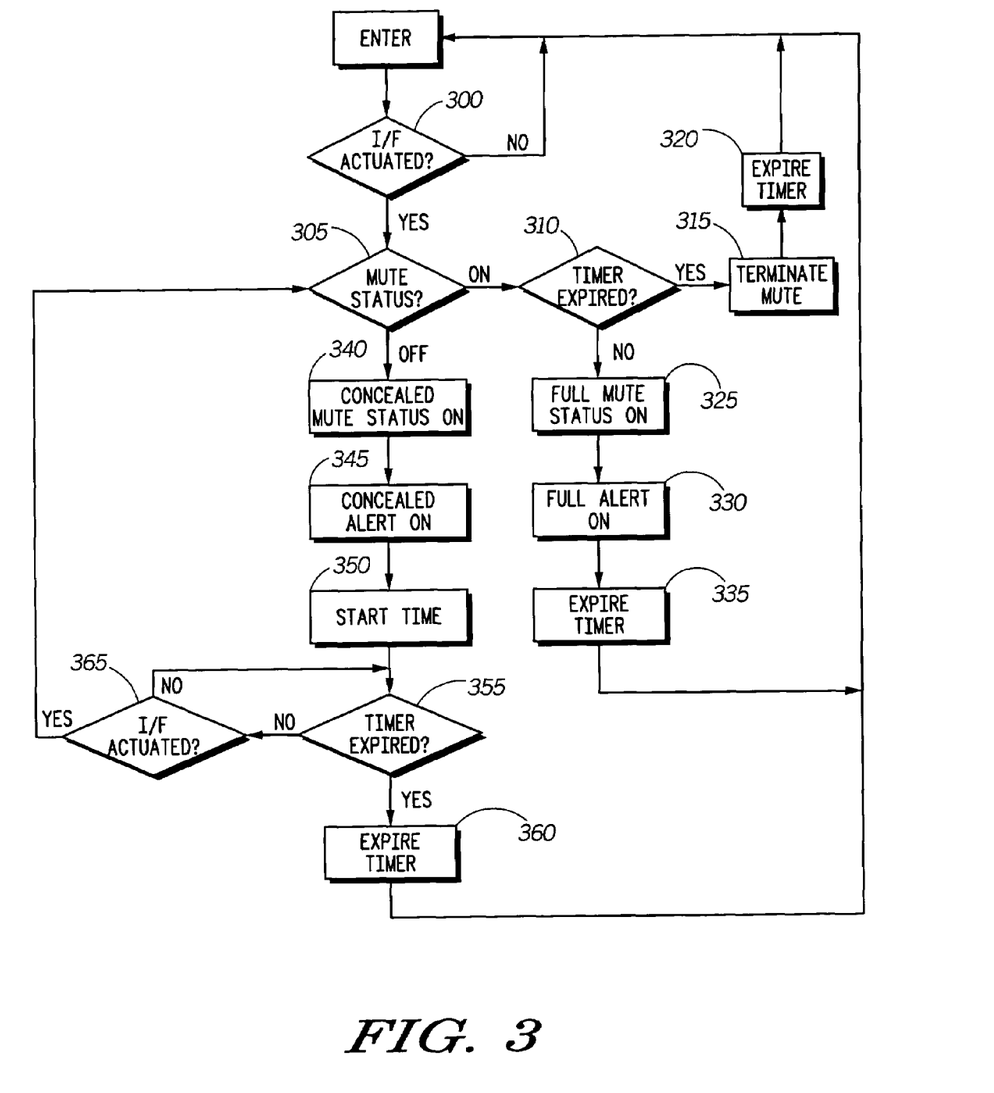
FIG. 3 is an operational flow diagram illustrating an operational sequence of the communication device of FIG. 2, according to one embodiment of the present invention.

When the mute tactile interface 250 is actuated the controller 202 communicates with the dual mute controller 226. The dual mute controller 226, for example, can be any of the dual mute controllers (111,113,115,117) of FIG. 1. The dual mute controller 226 preferably is a software algorithm, which implements a full mute controller 228 and/or a concealed mute controller 230. It will be appreciated by those of ordinary skill in the art that the dual mute controller 226 can be implemented as one single controller, two different controllers, or any other number of controllers as required to perform the operation of the communication device 200. The dual mute controller 226 provides the algorithms and rules to control the operation of the communication device 200 as the user interacts with the mute tactile interface 250. The data memory 222 preferably includes full mute data 232 and concealed mute data 234. When a user input is received by the mute tactile interface 250 and the controller 202 communicates with the dual mute controller 226, the dual mute controller 226 retrieves either the full mute data 232 or the concealed mute data 234 accordingly. The full mute data 232 can include, for example, one or more values to set in a timer when full mute is activated, one or more operational parameters such as display notifications and alerting operation to implement when full mute is activated. Further, full mute data 232 includes data for transceiver 220 and signal I/O 216 to deliver full mute signal to remote communication device communicatively coupled to the communication device 200. Similarly, the concealed mute data 234 can include, for example, one or more values to set in a timer when concealed mute is activated, one or more operational parameters such as display notifications and alerting operation to implement when concealed mute is activated. Concealed mute 234 also includes a sample of background noise, or attenuated background noise, collected via the noise sampler 210 and A/D converter 238, periodically updated and stored as a concealed mute data signal. FIG. 3 is a flow chart illustrating one embodiment of the operation of the communication device 200 of FIG. 2 in accordance with the present invention. As illustrated, the process begins with Step 300 in which it is determined whether or not the mute tactile interface 250 has been activated. For example, the controller 202 can query the status of the mute tactile interface 250 of the user activation interface 208 periodically checking for a user input, which activates it. When the mute tactile interface 250 is not activated, such as no user input has been received, the process periodically returns to Step 300 to check for activation. When activation of the mute tactile interface 250 is detected in Step 300, the process continues at Step 305 wherein the mute status is checked. For example, the controller 202 communicates with the dual mute controller 226 to determine whether the mute is turned on or off, whether full mute is activated, or whether concealed mute is activated. When the mute status is on in Step 305, the process continues at Step 310 in which the process determines whether a timer value is set. For example, the controller 202 checks the timer 236 to determine whether or not a value has been set. When a timer value is set, the process continues with Step 315 in which the mute is terminated. For example, the dual mute controller 226 sends a command to the controller 202 to terminate the mute by setting the mute status to off. Next, in Step 320, the timer value is reset. For example, the dual mute controller 226 informs the controller 202 to reset the timer value in the timer 236. The process then returns to Step 300 and periodically checks for mute tactile interface activation.

Returning to Step 310, when the timer value is not set in Step 310, the process moves to Step 325 in which the status is changed to full mute status on. For example, dual mute controller 226 informs the controller 202 to change the mute status to full mute status on. Next, in Step 330 the operational parameters such as the full alert stored as the full mute data 232 are initiated. The full mute data is delivered to transceiver 220 and signal I/O 216 to provide a full mute signal to the user of the remote device. The full mute signal can be repeatedly provided by the controller 202 to the transceiver 220 to generate the full mute at the remote user. Next, in Step 335, the timer value stored within the full mute data 232 in the timer 236 is set. The process then returns to Step 300 and periodically checks for mute tactile interface activation.

Returning to Step 305, when the mute status is off in Step 305, the process continues to Step 340 in which the concealed mute status is turned on. For example, the dual mute controller 226 informs the controller 202 to turn on the concealed mute status. Next in Step 345, the operational data contained within the concealed mute data 234 is initiated such as turning on the concealed alert. The concealed mute data is delivered to the transceiver 220 and to signal I/O 216 to provide concealed mute signal to a user of a remote communication device. The concealed mute signal can be repeatedly provided by the controller 202 to transceiver 220 to generate the concealed mute at the remote device. Next, in Step 350, the timer 236 is set to the timer value stored within the concealed mute data 234. Next, in Step 355, the process determines whether or not the timer has expired. When the timer has expired in Step 355, the process continues to Step 360 in which the timer value is set. The process then returns to Step 300 and periodically checks for mute tactile interface activation.

When the timer has not expired in Step 355, the process checks for mute tactile interface activation in Step 365. When the mute tactile interface 250 is not activated, the process periodically returns to Step 355, checking for expiration of the timer. When the mute tactile interface 250 is activated in Step 365, the process returns to Step 305 periodically checking the mute status.

The method and operation as illustrated and described in FIG. 3 provides a flexible, user controlled methodology for implementing a full mute and a concealed mute dependent upon the particular situation. By combining the functionality for both full mute and concealed mute and implementing within a simple, unobtrusive ergonomic system, the present invention as described herein resolves the existing problems described in a novel manner.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method in a communication device, the method comprising:
    detecting in the communication device an activation of a user interface by a first user input;
    in response to detection of the first user input, enabling a first muting mode for uplink audio sent from the communication device in a conference call environment;
    detecting in the communication device an activation of the user interface by a second user input; and
    in response to detection of the second user input, disabling the first muting mode and enabling a second muting mode for uplink audio sent from the communication device in a conference call environment.

2. The method of claim 1, further comprising:
detecting activation of the user interface by a third user input; and
in response to detection of the third user input, disabling the second muting mode for uplink audio sent from the communication device.

3. The method of claim 2, further comprising:
providing an alert upon the disabling of at least one of the first muting mode and the second muting mode for uplink audio sent from the communication device.

4. The method of claim 1, wherein the first muting mode is one of
a full muting mode in which there is no uplink audio from the communication device, and
a concealed muting mode in which the uplink audio from the communication device consists of only ambient noise.

5. The method of claim 4, wherein the second muting mode is the other one of the full muting mode and the concealed muting mode.

6. The method of claim 1, wherein:
the activation of the user interface by the second user input is detected in the communication device during a pre-determined time interval; and
in response to the detection of the second user input during the pre-determined time interval, disabling the first muting mode and enabling a second muting mode in the communication device.

7. The method of claim 6, wherein the pre-determined time interval is approximately one second.

8. The method of claim 1, further comprising:
providing a first alert upon the enabling of the first muting mode in the communication device.

9. The method of claim 8, further comprising:
providing a second alert upon the enabling of the second muting mode in the communication device.

10. The communication device, comprising:
a user interface responsive to user input; and
a controller, communicatively coupled to the user interface, for:
detecting in the communication device an activation of the user interface by a first user input;
in response to detection of the first user input, enabling a first muting mode for uplink audio sent from the communication device in a conference call environment;
detecting in the communication device an activation of the user interface by a second user input; and
in response to detection of the second user input, disabling the first muting mode and enabling a second muting mode for uplink audio sent from the communication device in a conference call environment.

11. The communication device of claim 10, further comprising:
a first mute controller communicatively coupled to the controller for providing the first muting mode for uplink audio sent from the communication device; and
a second mute controller communicatively coupled to the controller for providing the second muting mode for uplink audio sent from the communication device.

12. The communication device of claim 11, wherein the first mute controller is for providing one of
a full muting mode in which there is no uplink audio from the communication device, and
a concealed muting mode in which the uplink audio from the communication device consists of only an ambient noise level signal.

13. The communication device of claim 12, wherein the second mute controller is for providing the other one of the full muting mode and the concealed muting mode in the communication device.

14. The communication device of claim 10, further comprising:
a timer, communicatively coupled with the controller, for selectively providing a timer value to the controller, and wherein
the activation of the user interface by the second user input is detected in the communication device during a pre-determined time interval; and
in response to the detection of the second user input during the pre-determined time interval, disabling the first muting mode and enabling a second muting mode in the communication device.

15. The communication device of claim 10, further comprising:
an alert circuit, communicatively coupled to the controller, for providing alerts to a user of the communication device, and wherein the alert circuit provides a first alert upon the enabling of the first muting mode in the communication device.

16. The communication device of claim 15, wherein the alert circuit provides a second alert upon the enabling of the second muting mode in the communication device.

17. The communication device of claim 16, wherein the alert circuit provides a third alert upon the disabling of at least one of the first muting mode and the second muting mode in the communication device.

18. The communication device of claim 10, wherein the first muting mode is one of a full muting mode and a concealed muting mode.

19. The communication device of claim 18, wherein the second muting mode is the other one of the full muting mode and the concealed muting mode.

20. A communication device, comprising:
a noise sampler for sampling an ambient noise level of the environment in which the communication device is operating, and for producing an ambient noise level signal representative of the ambient noise level;
an analog-to-digital converter coupled to the noise sampler;
a microphone for capturing audio comprising audio of a near-end user of the communication device;
a switch for selectively coupling the microphone to the analog-to-digital converter;
a user interface responsive to user input, for allowing a user to select uplink audio from the communication device;
a memory for storing an ambient noise level signal; and
a controller, communicatively coupled to the user interface, to the noise sampler, to the analog-to-digital converter, to the microphone, and to the switch, the controller for detecting a user input, and, in response to the user input, actuating the switch for establishing as uplink audio one of:
only audio captured by the microphone,
only the ambient noise level signal from the memory, and
no audio.

21. The communication device of claim 20, including an alert circuit for providing an alert each occasion that the switch is actuated.

22. The communication device of claim 20, in which the noise sampler periodically samples the ambient noise level of the environment in which the communication device is operating, and periodically produces an ambient noise level signal representative of the latest ambient noise level, and in which the controller updates the memory with the ambient noise level signal representative of the latest ambient noise level.

* * * * *